United States Patent [19]

Dysarz

[11] Patent Number: 5,662,306
[45] Date of Patent: Sep. 2, 1997

[54] CLEAT MOUNTED CHANNEL HOLDING DEVICE

[76] Inventor: Edward Dysarz, 11423 Triola La., Houston, Tex. 77072

[21] Appl. No.: 645,203

[22] Filed: May 13, 1996

[51] Int. Cl.⁶ ............................................. F16M 13/00
[52] U.S. Cl. ............................ 248/514; 248/538; 43/21.2
[58] Field of Search ................................. 248/514, 515, 248/534, 538, 278.1, 292.12; 43/21.2

[56] References Cited

U.S. PATENT DOCUMENTS

| | | | |
|---|---|---|---|
| 3,010,687 | 11/1961 | Hagberg | 248/278.1 X |
| 3,224,716 | 12/1965 | Eville et al. | 248/514 |
| 3,747,881 | 7/1973 | Akamu | 248/538 X |
| 4,198,775 | 4/1980 | Leisner | 43/21.2 |
| 4,202,125 | 5/1980 | Kovacs | 43/21.2 X |
| 4,528,768 | 7/1985 | Anderson | 248/514 X |
| 4,587,603 | 5/1986 | Hughes | 362/427 |
| 4,614,323 | 9/1986 | Bauer | 248/538 X |
| 5,142,809 | 9/1992 | O'Brien et al. | 43/21.2 |
| 5,195,704 | 3/1993 | Louie | 248/67.5 |
| 5,437,122 | 8/1995 | Wilson | 43/21.2 |
| 5,445,355 | 8/1995 | Chen | 248/514 |
| 5,520,141 | 5/1996 | Lutz | 248/514 X |

FOREIGN PATENT DOCUMENTS

2275857  9/1994  United Kingdom ............. 43/21.2

Primary Examiner—Lanna Mai

[57] ABSTRACT

A device that can be fixed to a cleat mounted on a boat, dock, deck, pier or wherever a cleat is available. The L hook or J hook of the device is placed in the cleat gap and the channel is placed over the sides and top of the cleat, the wing nut is tightened, fixing the cleat mounted channel and hook holding device to the top of the cleat and the sides of the cleat. The rod holder, lamp holder, umbrella holder is fixed to the cleat mounted channel and holding device and a fishing rod, lamp, umbrella is placed into the rod holder, lamp holder or umbrella holder.

8 Claims, 8 Drawing Sheets

CLEAT MOUNTED CHANNEL HOLDING DEVICE

BACKGROUND OF THE INVENTION

There are various means of mounting rod holders, lamps, grills, torches, umbrellas and other devices to a boat or some docks that may be made out of concrete, but in all cases the devices will have to be screwed or bolted to the boat or concrete dock. To screw or a bolt a device to a boat or concrete dock, more holes will have to be drilled thereby damaging or weakening the boat or dock and further accelerating corrosion or deterioration of the material that makes up the boat or dock.

There are also clamp on devices but often they too damage a boat or dock and most often there is no place on the boat or concrete dock to clamp, the clamp on to the device.

When using the cleat mounted channel holding device of this invention, the device is clamped to an existing cleat on the boat wherein the cleat is placed on the boat by the manufacturer of the boat and the area where the cleat is mounted, is usually reinforced to withstand greater forces such as towing or docking a boat with the cleat. The same holds true for concrete docks.

SUMMARY

It is the object of the present invention to make a satisfactory holding device that can easily be fixed to an existing cleat on a boat or dock.

It is still another object of the present invention to make a satisfactory holding device that could be suitably mounted to a boat or a dock without making any additional screw or bolt holes in the boat or dock.

The features of the present invention can be best understood with further objects and advantages by reference to the following descriptions taken in conjunction with accompanying drawings wherein like numerals indicate like parts.

DETAILED DESCRIPTION OF THE FIRST AND SECOND PREFERRED EMBODIMENTS

Figure 1:
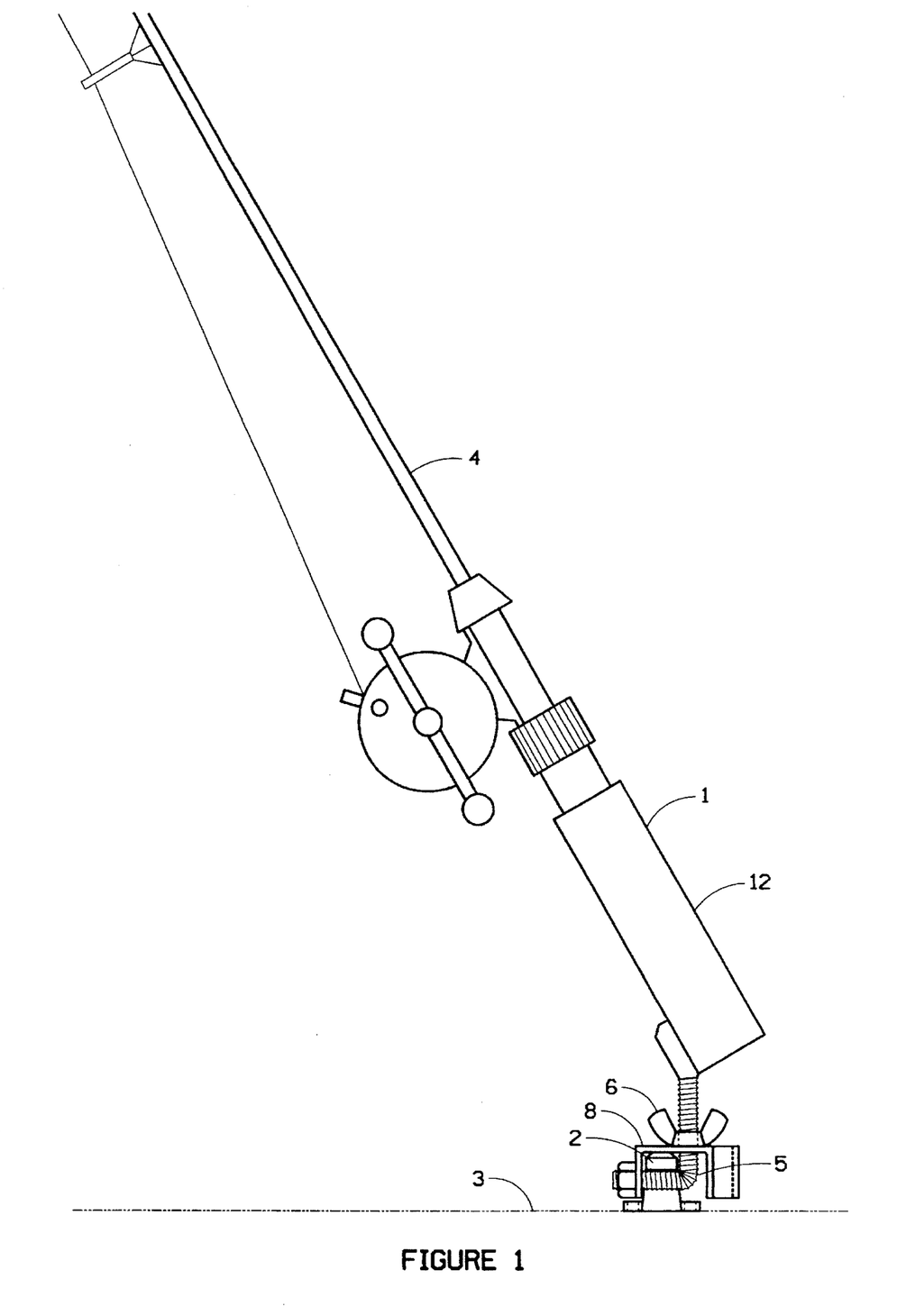
FIG. 1 is an elevation view of the Cleat Mounted Channel Holding Device of the first preferred embodiment mounted on a cleat and holding a fishing rod.

Referring to FIG. 1 there is shown an elevation view of the cleat mounted channel holding device 1 of the first preferred embodiment holding a fishing rod 4 or some other tool not shown.

The device 1 is shown mounted on a cleat 2 that is mounted on a boat 3. The device 1 could also be mounted on a dock, pier, or deck by design choice. A fishing rod 4 is shown held in the tube 12 of the device 1. The tube 12 is suitably fixed to the threaded L rod 5 which will be seen more clearly in FIG. 2 and FIG. 3. The threaded L rod 5 is shown held to the channel 8 by a wing nut 6 located on the third end of the channel 8. The channel 8 has a first end, a second end, a third end and a fourth end which will be seen more clearly on other figures.

Figure 2:
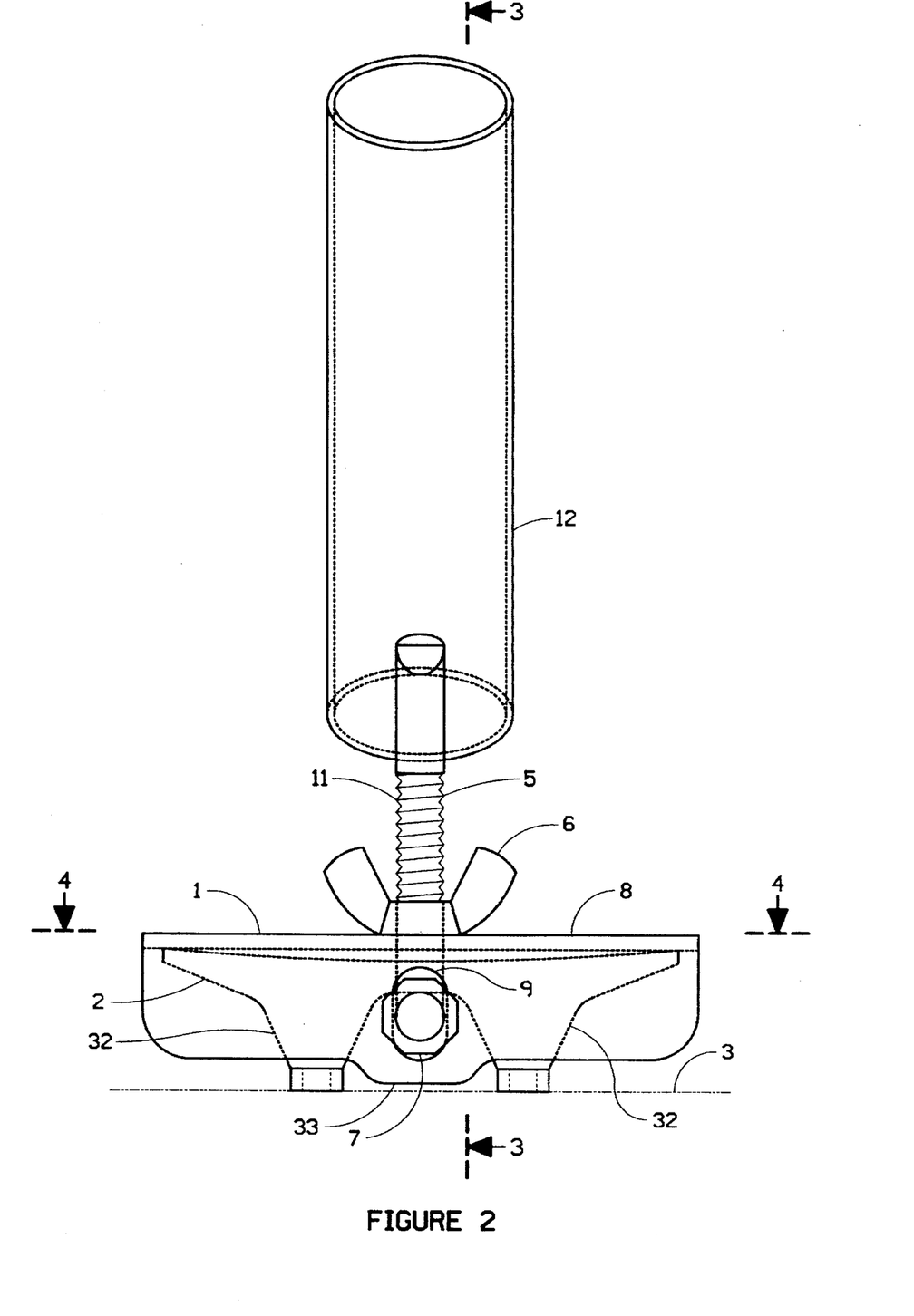
FIG. 2 is an enlarged elevation view of the Cleat Mounted Holding Device.

Referring to FIG. 2 there is shown an elevation view of the cleat mounted channel holding device 1 mounted on a cleat 2 which is mounted on a boat 3 or dock or deck.

The tube 12 is shown with a first end and a second end. The first end of the tube 12 is open to receive a fishing rod or whatever is to be held. The second end of the tube 12 is shown suitably fixed to the threaded L rod 5 by welding or other suitable means. The L rod 5 is shown with threads 11 that suitably mesh with the threads inside of the wing nut 6 and the side nut 7.

The wing nut 6 is shown compressed or tightened against the third end of the channel 8. The first end of the channel 8 extends over the left end of the cleat 2 and the second end of the channel 8 extends over the right end of the cleat 2. The side nut 7 is shown over the side channel slot 9 formed on the fourth end of the channel 8. A slot bar 33 is shown at the lower end of the side channel slot 9 to strengthen the side channel slot area. The fourth end of the channel 8 is shown pressing or thrusting against each cleat stanchion 32 which will prevent the channel from rotating if an outward force is applied to the tube 12.

Figure 3:
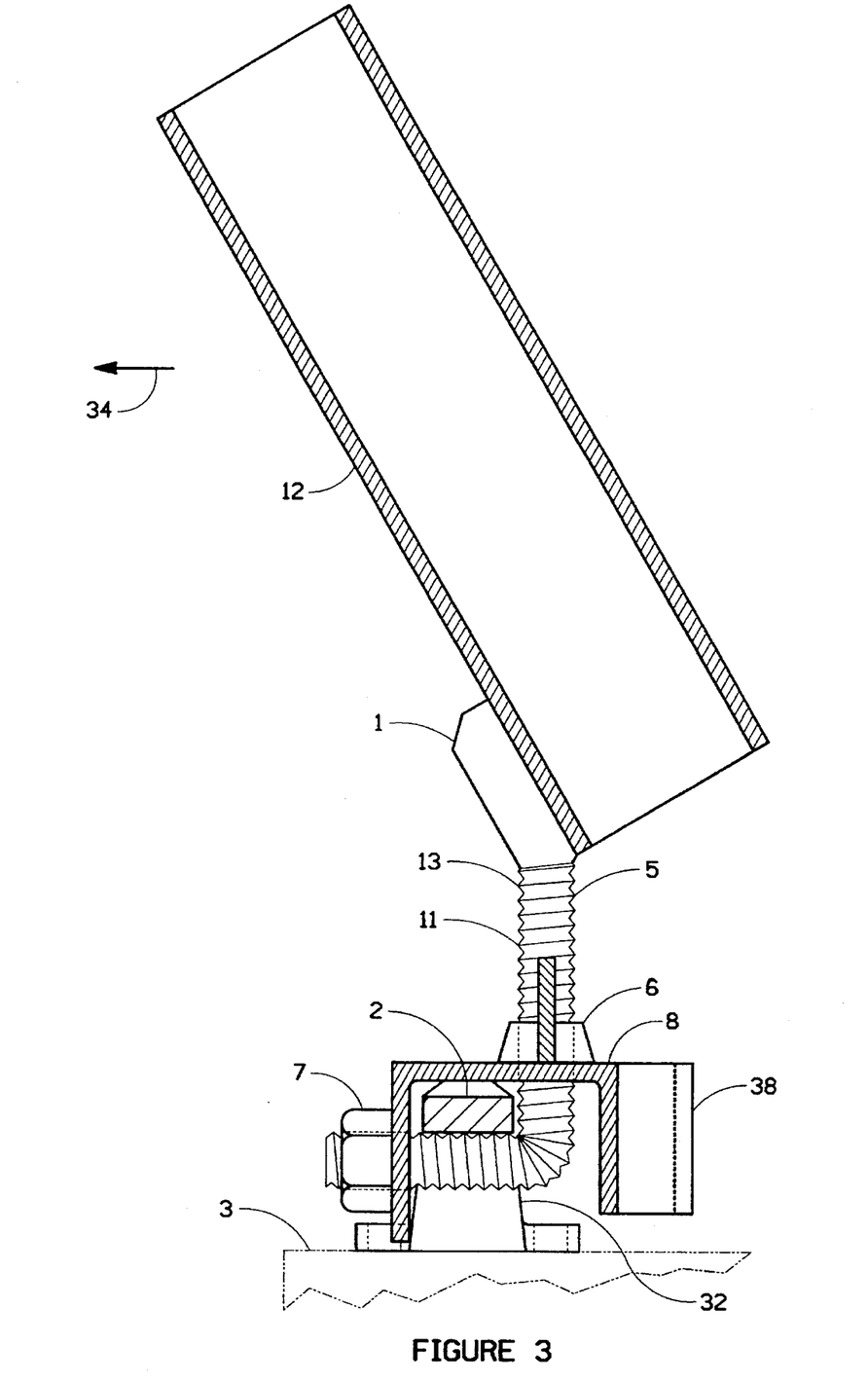
FIG. 3 is a section elevation view as taken through FIG. 2.

Referring to FIG. 3 there is shown a section elevation of the cleat mounted channel holding device 1 of the first preferred embodiment as taken through FIG. 2.

The tube 12 with a first end and a second end is shown as being hollow. The first end of the L rod 5 is shown suitably fixed to the second end of the tube 12. The L rod 5 is also shown with a slight bend 13 which may or may not be used by design choice. The L rod 5 is shown disposed within the wing nut 6 and further extends through a top channel slot not seen in this view wherein the L rod 5 bends around the cleat 2 and further extends through the side channel slot where the second end of the L rod 5 is disposed within the side nut 7.

When the side nut 7 and the wing nut 6 are tightened, the inside of the third side of the channel 8 and the inside of the fourth side of the channel 8 are compressed against the cleat 2 thus locking or securing the cleat mounted channel holding device 1 to the cleat 2 wherein a force may be placed on the tube 12 in any direction and the cleat mounted channel holding device 1 will not move in any direction.

When the tube 12 is being pulled in an outboard direction 34 such as a fish pulling on a fishing rod in the tube 12, the greatest moment will be applied in an outboard direction and the moment or load will be applied through the tube 12 into the L rod 5 and into the fourth end of the channel 8 where it will be taken into the cleat stanchion 32 and then into boat 3. The slot extension 38 is shown suitably fixed to the end of the channel 8 by welding or other suitable means.

Figure 4:
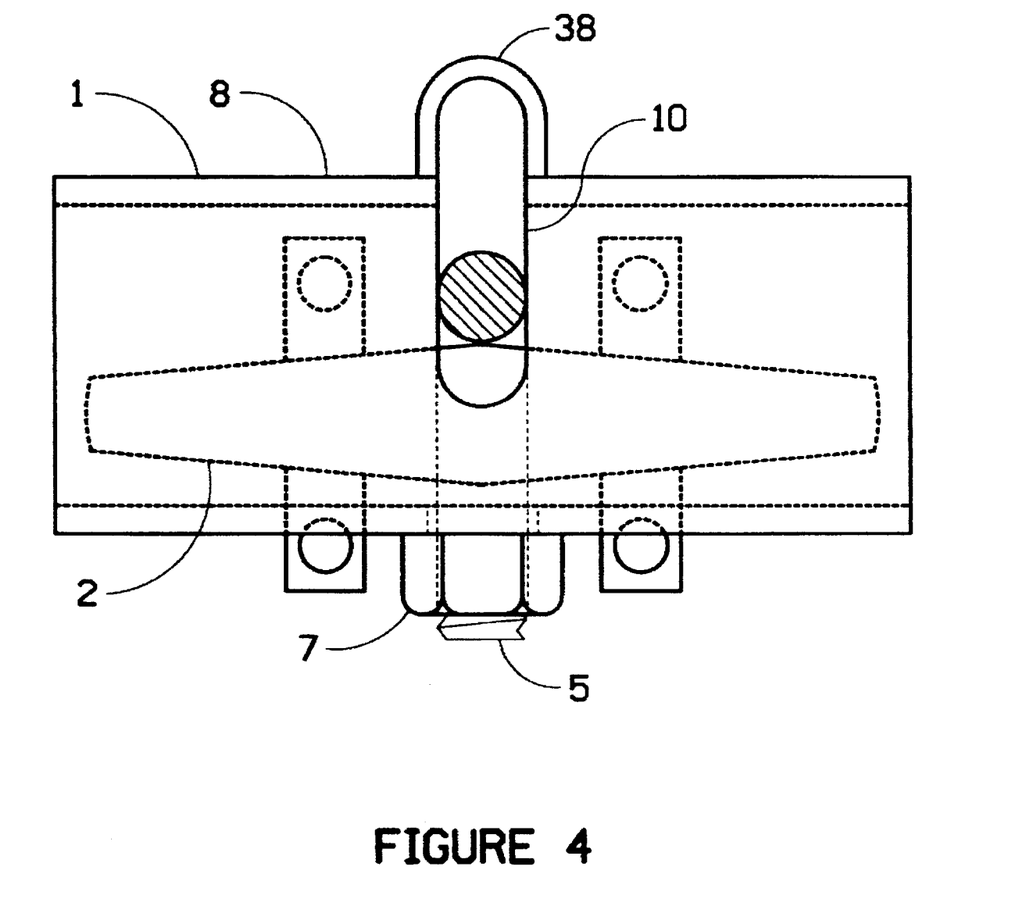
FIG. 4 is a section plan view as taken through FIG. 3.

Referring to FIG. 4 there is shown a plan section view of the cleat mounted channel holding device 1.

The channel 8 is shown over the cleat 2. The top channel slot 10 is shown formed in the third end of the channel 8. The L rod 5 is shown disposed within the top channel slot 10. The second end of the L rod 5 is shown with the side nut 7 suitably fixed to the L rod 5. The side channel slot 9 and the top channel slot 10 are formed in the channel 8 to allow the cleat mounted channel and hook holding device 1 to be suitably mounted on various sizes of cleats 2. The slots are also formed in the channel 8 to allow for easy installation and removal on the cleat 2. The slot extension 38 is shown suitably fixed to the fifth end of the channel 8 by welding or other suitable means. The slot extension 38 strengthens the channel 8 and further allows more motion of the L rod 5 while installing the device 1 or removing the device 1 from the cleat 2.

Figure 5:
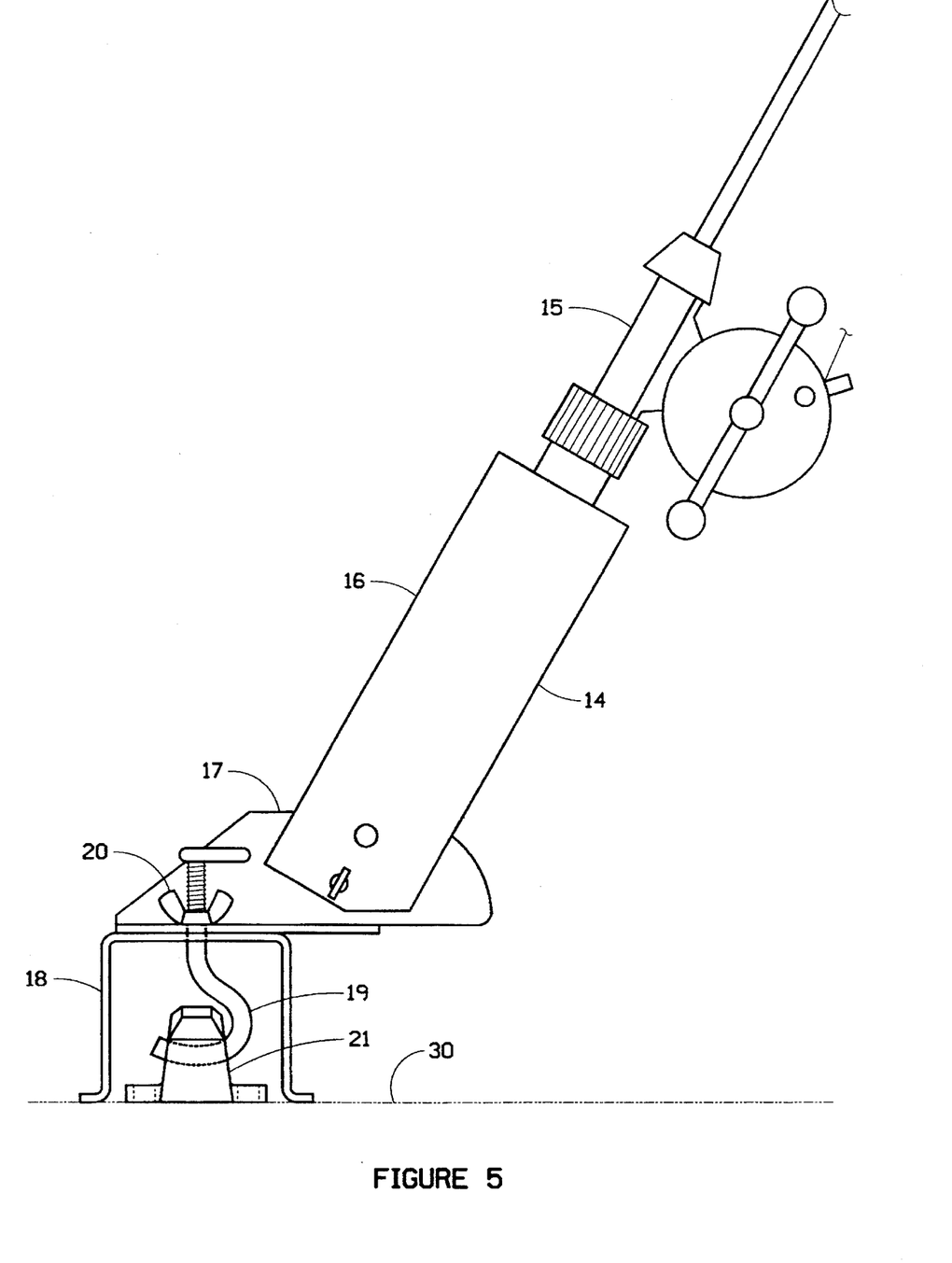
FIG. 5 is an elevation view of a Cleat Mounted Channel and Cleat Hook Device of the second preferred embodiment Mounted on a cleat and holding a fishing rod.

Referring to FIG. 5 there is shown an elevation view of the channel and hook cleat mounting device 14 of the second preferred embodiment holding a fishing rod 15; however, it could also be used to hold other tools.

The channel and hook cleat mounting device 14 is shown supporting a fishing rod 15 in an elongated tube 16. The elongated tube 16 is suitably connected to a swivel angle 17 by pins not shown in this view. The swivel angle 17 is held to the mounting channel 18 by the first end of the J hook 19 and the wing nut 20. The J hook 19 is shown hooked to the cleat 21 which will be shown more clearly in other details.

The cleat 21 is shown mounted on a boat 30 or a dock or a pier or a deck by circumstances or choice. The cleat 21 is considered a standard cleat and the channel and hook cleat mounting device will fit any size cleat available for boats, docks, piers and decks. If a large commercial cleat is available, a larger version of the channel and hook cleat mounting device may be required.

Figure 6:
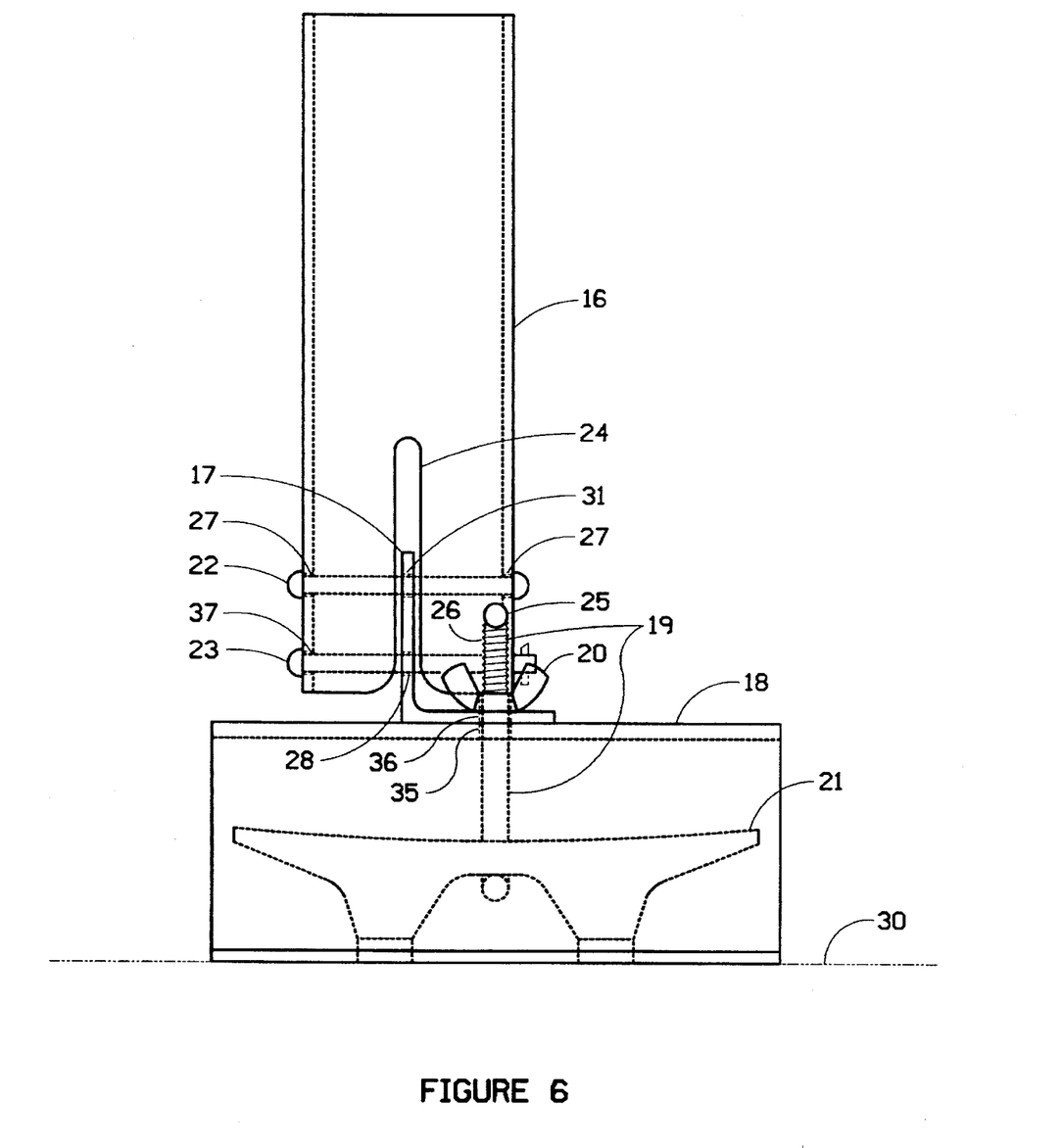
FIG. 6 is an elevation view of the device of the second preferred embodiment.

Referring to FIG. 6 there is shown an enlarged frontal elevation view of the channel and hook cleat mounting device 14 of the second preferred embodiment.

The elongated tube 16 is shown with a first end and a second end. The second end of the elongated tube 16 has a pivot slot 24 formed around the upper end of the swivel angle 17. The pivot slot 24 is greater in length than the swivel angle 17 to allow the elongated tube 16 to be rotated around the upper end of the swivel angle 17, as will be apparent in FIG. 7.

Figure 7:
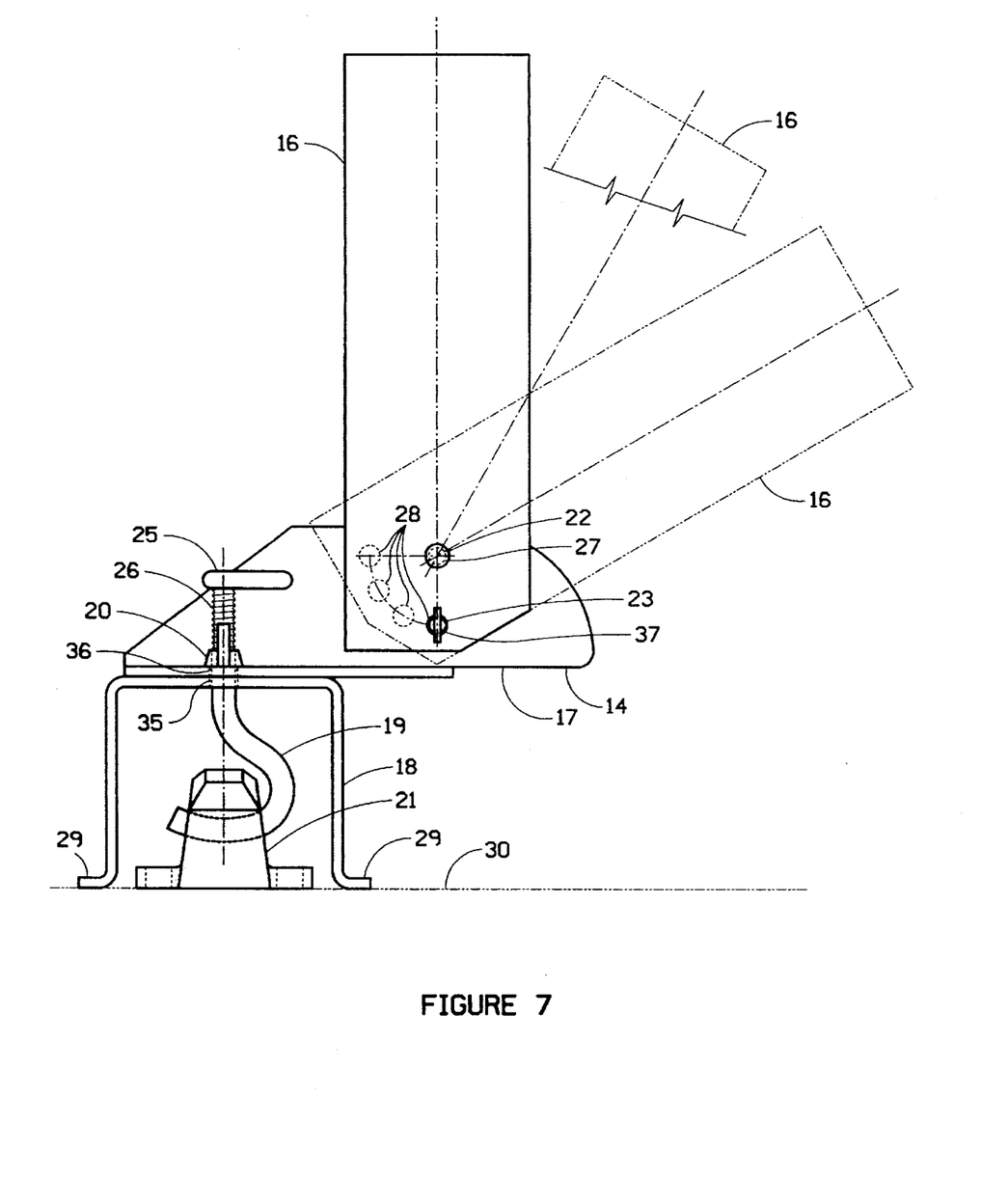
FIG. 7 is an elevation view of the device.

The enlarged tube 16 rotates about the pivot pin 22 that is inserted into the side holes 27 formed in the elongated tube 16 and the pivot hole 31 formed in the first end of the swivel angle 17 and the elongated tube 16 is held in the desired angle with the adjustment pin 23 which will also be more clearly demonstrated in FIG. 7. The adjustment pin 23 is also shown in one of the arc holes 28 formed in the swivel angle 17 and the adjustment holes 37 formed in the elongated tube 16.

The grasp bar 25 is shown fixed to the first end of the J hook 19 and the threads 26 are also shown near the first end of the J hook 19. The wing nut 20 is shown suitably fastened near the first end of the J hook 19. The threads formed on the inside of the wing nut 20 mesh with the threads 26 on the J hook 19. The J hook 19 is further disposed through the wing nut 20, through the swivel hole 36 formed in the swivel angle and the channel hole 35 at the first end of the mounting channel 18. The J hook 19 is also hooked around the cleat 21 which is mounted on the boat 30.

Referring to FIG. 7 there is shown an elevation view of the channel and hook cleat mounting device 14.

The elongated tube 16 is shown in at least three positions and could be rotated in an arc from vertical to horizontal or greater if desired. To rotate the elongated tube 16 the adjustment pin 23 is removed, and the elongated tube 16 is rotated to the desired angle about the pivot pin 22 and the adjustment pin 23 is reinserted through the side holes 27 formed near the second end of the elongated tube 16 and further the adjustment pin 23 is also inserted into one of the desired arc holes 28 formed in desired locations in the first end of the swivel angle 17. The arc holes 28 are located in various positions by design choice and more arc holes 28 could be added or removed if desired.

The J hook 19 is shown hooked around the cleat 21 at the second end of the J hook 19. The first end of the J hook 19 is disposed through the channel hole 35 formed in the second end of the mounting channel 18 and the swivel hole 36 formed in the swivel angle 17 where the wing nut 20 is suitably disposed and tightened to the threads 26 formed on the first end of the J hook 19. The grasp bar 25 is shown suitably fixed to the first end of the J hook 19 wherein in this figure the grasp bar 25 is parallel to the second end of the J hook to enable one that is applying the J hook 19 to the cleat 21 to know the direction of the second end of the J hook and to suitably hold the J hook while the wing nut 20 is being tightened on the threads near the first end of the J hook 19.

When the wing nut 20 is suitably tightened, the J hook will be pulling up on the cleat 21 and the wing nut will be pushing down on the swivel angle 17 and the mounting channel 18 further thrusting the mounting channel into the boat 30, dock or pier depending on what the cleat 21 is mounted on, thus locking the channel and hook cleat mounting device to the cleat 21.

The mounting channel 18 has a bearing flange 29 on each side to prevent the mounting channel 18 from damaging the surface of the boat 30, dock or pier. The bearing flange 29 is shown as part of the mounting channel but it could also be made out of rubber, plastic or a different material by design choice.

Figure 8:
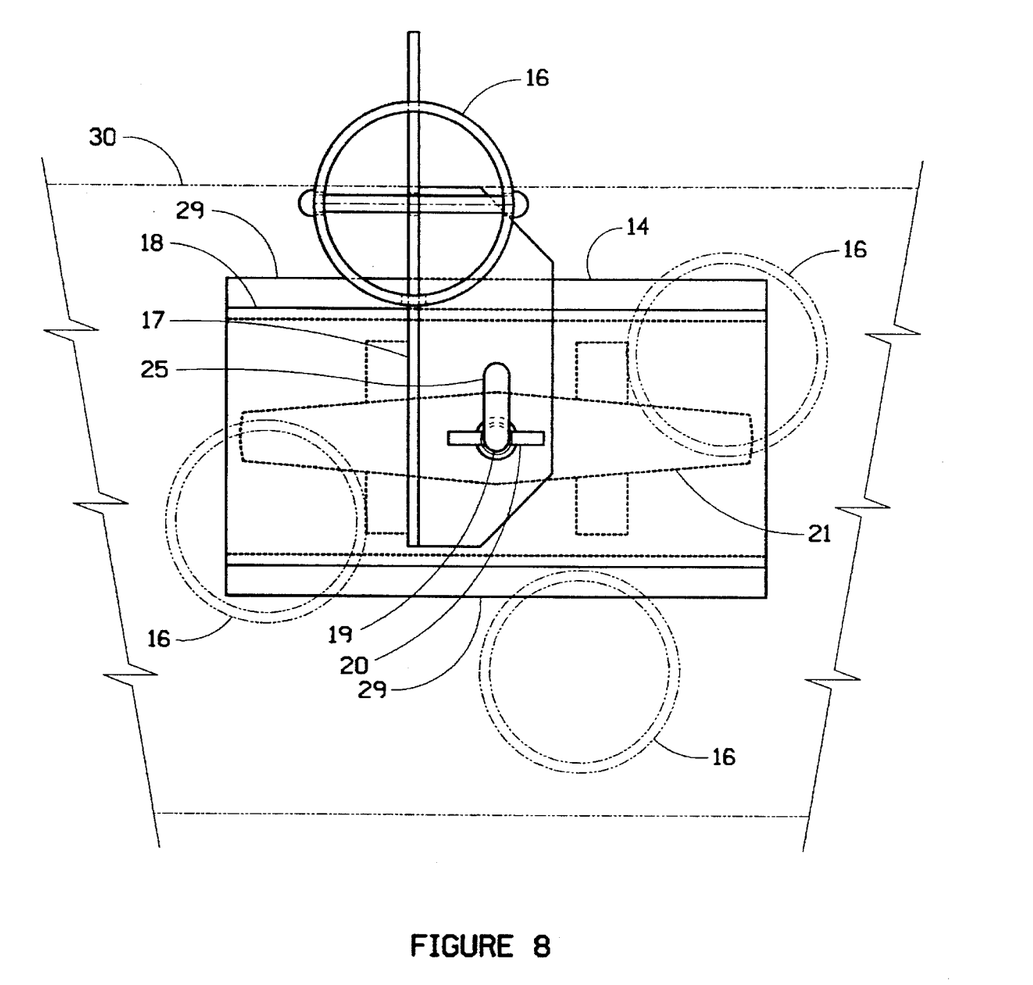
FIG. 8 is a plan view of the device rotated to four positions relative to the cleat.

Referring to FIG. 8 there is shown a plan view of the channel and hook cleat mounting device 14.

The elongated tube 16 is shown in four various locations; the number of locations could be infinite as the swivel angle 17 can be rotated 360° relative to the mounting channel 18 or the cleat 21 or the grasp bar 25.

To rotate the elongated tube 16 mounted on the swivel angle 17, the wing nut 20 is loosened on the J hook 19, the swivel angle 17 is rotated to the desired angle relative to the mounting channel 18 and the cleat 21 and then the wing nut 20 is tightened securing the swivel angle 17. Although it is not shown in FIG 8, the elongated tube 16 can be rotated from the vertical position or any position to a horizontal position or any position in-between. The bearing flange 29 shown on each side of the mounting channel 18 are pressing into the boat or dock or deck.

Although the system described in detail supra has been found to be most satisfactory and preferred many variations are possible. For example, an angle adjustment device could be added to the L rod wherein the tube could be adjusted to almost any angle from vertical to horizontal or the tube could be rotated horizontally in any direction.

Although the invention has been described reference to the preferred embodiment, it will be understood by those skilled in the art that additions, modifications, substitutions, deletions and other changes not specifically described, may be made in the embodiments herein, it should be understood that the details herein are to be interpreted as illustrative and are not in a limiting sense.

What is claimed as invention is:

1. A cleat mounted channel holding device for holding a fishing rod or other tools wherein said cleat mounted channel holding device is mounted on a cleat that is mounted on a boat, a dock, a pier or a deck, comprised of;

at least one tube with a first end and a second end;
at least one L rod with a first end and a second end wherein said first end of said L rod is fixed to said second end of said tube; and wherein said L rod has threads formed on the outside surface of said L rod and said L rod is bent to form an L;

at least one wing nut wherein said wing nut has a hole with threads formed in said wing nut and said wing nut is disposed around said L rod and said threads of said wing nut mesh with said threads formed on said L rod;

at least one channel with a first end, a second end a third end, a fourth end and a fifth end wherein a top channel slot is formed in said third end of said channel and a side channel slot is formed in said fourth end of said channel;

at least one side nut wherein said nut has a hole formed in said channel side nut with threads formed in said hole and said threads mesh with said threads of said L rod wherein said L rod is disposed in said wing nut in said top channel slot around said cleat and said L rod is further disposed in said side channel slot and said side nut wherein said side nut is tightened in said fourth side of said channel, and said wing nut is tightened in said third side of said channel wherein said channel and said L rod are compressed around said cleat thereby locking said cleat mounted channel holding device to said cleat and further supporting said tube fixed to said first end of said L rod providing a holding device wherein a fishing rod or other tool is inserted into said tube and supported by said tube.

2. The cleat mounted channel holding device of claim 1 wherein said tube, said L rod, said wing nut, said channel and said side nut are made out of metal.

3. The cleat mounted channel holding device of claim 1 wherein said tube, said L rod, said wing nut, said channel and said side nut are made out of plastic.

4. The cleat mounted channel holding device of claim 1 wherein to remove said cleat mounted channel holding device, said wing nut is loosened, said side nut is removed and said L bar is pulled away from said cleat.

5. A channel and hook cleat mounting device for holding a fishing rod or other tools wherein said channel and hook cleat mounting device is mounted on a cleat that is further mounted on a boat, a dock a pier or a deck comprised of;

at least one elongated tube wherein said elongated tube has a first end and a second end;

at least one swivel angle wherein said swivel angle has a first end and a second end, a third end and a fourth end; and wherein a swivel hole is formed near said second end of said swivel angle and wherein said first end of said swivel angle is rotatably fixed to said second end of said elongated tube;

at least one J hook with a first end and a second end wherein threads are formed on said first end of said J hook and said second end of said J hook is formed into a hook wherein said hook will hook around said cleat;

a wing nut with a hole and threads formed in said hole formed in said wing nut wherein said wing nut is disposed around said threaded first end of said J hook and wherein said threads formed in said wing nut will mesh with said threads formed on said first end of said J hook;

at least one mounting channel wherein said mounting channel has a first end and a second end a third end and a fourth end wherein a channel hole is formed in said second end of said mounting channel wherein said first end of said J hook is disposed in said channel hole and wherein said first end of said J hook is-further disposed in said pivot hole formed in said second end of said swivel angle and wherein a said second end of said J hook is further disposed in said wing nut wherein said threads formed in said hole of said wing nut mesh with said threads formed on said first end of said J hook and wherein said second end of said J hook is hooked around said cleat and wherein said wing nut is turned and tightened in said first end of said J hook, thrusting down on said swivel angle and further thrusting down on said second end of said mounting channel and further forcing said first and third end of said channel to thrust into said boat and further causing said second end of said J hook to pull up on said cleat thus locking said channel and hook cleat mounting device to said cleat and to said boat further locking said swivel angle and said elongated tube to said boat, dock, or pier to be used as a holding device for a fishing rod or the like.

6. The channel and hook cleat mounting device of claim 5 wherein said mounting channel has at least one bearing flange on said first end and said third end wherein said bearing flange will prevent damage to said boat, dock or pier.

7. The channel and hook cleat mounting device of claim 5 wherein a grasp bar is fixed to said first end of said J hook wherein said grasp bar may be gripped by fingers and or the thumb thereby allowing said J bar to be held and rotated without slipping while indicating the direction of said J hook.

8. The channel and hook cleat mounting device of claim 5 wherein said swivel angle further has at least one arc hole formed in said first end of said swivel angle and said swivel angle has at least one pivot hole formed in said first end of said swivel angle and wherein at least two adjustment holes are formed in said second end of said elongated tube and at least two side holes are formed in said second end of said swivel angle wherein a pivot pin is disposed into said side holes and said pivot holes thereby allowing said elongated tube to rotate about said pivot pin and wherein an adjustment pin is further disposed into said adjustment holes formed in said second end of said elongated tube and into said pivot hole formed in said first end of said swivel angle thereby locking said elongated tube to said swivel angle at whatever angle one would desire to place said elongated tube relative to said boat, dock or pier.

* * * * *